(No Model.)
L. P. CARL.
TETHER PIN.
No. 444,661. Patented Jan. 13, 1891.
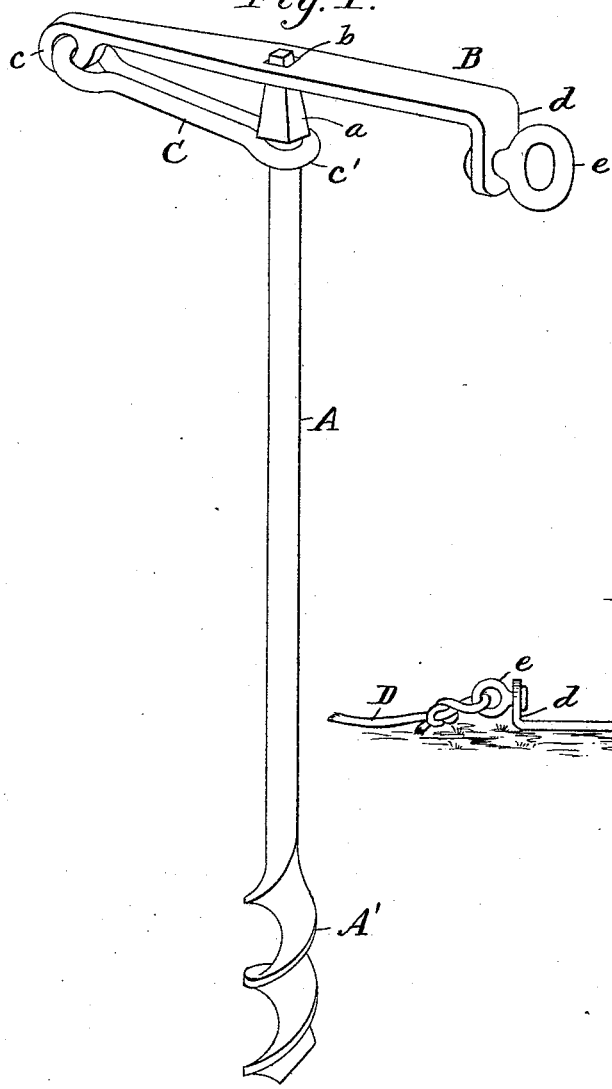
WITNESSES:
J. Henry Shiberath.
C. Sedgwick
INVENTOR:
L. P. Carl
BY Munn & Co
ATTORNEYS

UNITED STATES PATENT OFFICE.

LORIS P. CARL, OF PERRIS, CALIFORNIA.

TETHER-PIN.

SPECIFICATION forming part of Letters Patent No. 444,661, dated January 13, 1891.

Application filed October 29, 1890. Serial No. 369,646. (No model.)

*To all whom it may concern:*

Be it known that I, LORIS P. CARL, of Perris, in the county of San Diego and State of California, have invented a new and useful Tether-Pin, of which the following is a full, clear, and exact description.

This invention relates to an improved device for tethering animals to prevent them from going astray, and has for its objects to provide a simple, convenient, and inexpensive device which will afford means to quickly secure the halter or tether-rope to the ground at any desired point.

A further object is to provide an adjustable tether-pin with a swivel device for connection of a tether-rope thereto in a manner which will avoid fouling of the tether.

To these ends my invention consists in the construction and combination of parts, as is hereinafter described and claimed.

Reference is to be made to the accompanying drawings, forming a part of this specification, in which similar letters of reference indicate corresponding parts in both the figures.

Figure 1 is a perspective view of the device adjusted for insertion into the ground; and Fig. 2 represents the device inserted into the ground and extended for service, a tether-rope being shown attached to the device and broken away.

The pin proper consists of an elongated shank A, made of any suitable metal, the body of which is preferably rounded. The portion of the shank A which is to enter the ground first is flattened and then twisted into auger form, as shown at A' in Fig. 1. Upon the upper end portion of the shank A an integral head *a* is formed, which enlargement is made square and tapered toward its terminal end.

A handle-bar B is provided, which is of proper length to serve as a lever for the insertion of the auger portion A' of the tether-pin into hard ground, said bar having a square aperture *b* formed in it transversely and near its longitudinal center, which aperture is designed to receive the squared end portion or head *a* of the shank A. One end *c* of the handle-bar B is enlarged to permit a lateral perforation to be produced in it, wherein an elongated link C is loosely secured, the other end *c'* of said link being adapted to loosely embrace the round shank A of the pin.

It is essential for the convenient operation of the handle-bar B, when it is used to rotate the shank A and insert it into the ground, that the link C shall be so proportioned in length thereto as to serve as a brace to the handle-bar when the parts are assembled, as shown in Fig. 1, the relative formation of the link and handle-bar permitting the latter to fold over and engage the squared portion or head *a* of the pin-shank when the latter is to be inserted into the soil.

Upon the free end of the handle-bar B a right-angle bend is produced, thereby affording a lateral lug *d*, which lug is perforated to receive the stem of a ring-eye *e*, which is loosely secured to swivel in the lug and permit the ring-eye to rotate freely.

To insert the shank A into the ground for service, the handle-bar B is lapped over and interlocked with the square head of the shank A, when the latter will be converted into an auger, as downward pressure on the handle-bar will draw the link C closely in contact with the head *a* and give stability to the connection of parts, while the swiveling of the ring-eye *e*, to which a rope D is secured, will prevent the latter from being improperly twisted. After the shank A has been inserted so as to permit a short portion to project, the handle-bar B is folded outwardly, as shown in Fig. 2, and the animal, which is attached to a prolongation of the rope D, will be securely tethered.

Having thus described my invention, I claim as new and desire to secure by Letters Patent—

1. The combination, with a shank having an auger on one end and an integral squared and tapered head on the other end, of a link, a handle-bar loosely secured to the link and perforated to engage the head, and a ring-eye swiveled on the free end of the handle-bar, substantially as set forth.

2. The combination, with a rounded shank having an auger formed on one end and a squared longitudinally-tapered enlargement or head on the other end, of an elongated closed link loosely retained on the shank by one of its ends, a handle-bar having a square aperture near its longitudinal center to receive the shank-head, a hinge jointed by one end to the outer end of the link, and a ring-eye having a swiveled engagement with a lug bent at a right angle to the free end portion of the handle-bar, substantially as set forth.

LORIS P. CARL.

Witnesses:
HARRY SYPHERD,
JOHN R. MOORE.